(12) United States Patent
Rocher

(10) Patent No.: US 9,376,072 B2
(45) Date of Patent: Jun. 28, 2016

(54) MOTOR VEHICLE ELECTRONIC COMPUTER COMPRISING A ROBUST PERIPHERAL, ASSOCIATED MOTOR VEHICLE

(71) Applicant: Jacques Rocher, Saint-Orens de Gameville (FR)

(72) Inventor: Jacques Rocher, Saint-Orens de Gameville (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/379,639

(22) PCT Filed: Feb. 20, 2013

(86) PCT No.: PCT/EP2013/000491
§ 371 (c)(1),
(2) Date: Aug. 19, 2014

(87) PCT Pub. No.: WO2013/124060
PCT Pub. Date: Aug. 29, 2013

(65) Prior Publication Data
US 2015/0039181 A1 Feb. 5, 2015

(30) Foreign Application Priority Data

Feb. 23, 2012 (FR) ...................................... 12 00532

(51) Int. Cl.
*B60R 16/03* (2006.01)
*B60R 16/033* (2006.01)

(52) U.S. Cl.
CPC ............... *B60R 16/03* (2013.01); *B60R 16/033* (2013.01)

(58) Field of Classification Search
CPC ........ G06F 1/266; G06F 1/3215; G06F 1/325
USPC .............................. 701/36; 713/320, 300, 324
See application file for complete search history.

(56) References Cited

U.S. PATENT DOCUMENTS 4,906,055 A * 3/1990 Horiuchi ................. G01R 15/04
324/426
5,083,078 A 1/1992 Kubler et al.
(Continued)

FOREIGN PATENT DOCUMENTS

FR 2 951 880 A1 4/2011
WO 2010/094397 A1 8/2010

OTHER PUBLICATIONS

International Search Report, dated Sep. 5, 2013, from corresponding PCT application.

*Primary Examiner* — Marthe Marc-Coleman
(74) *Attorney, Agent, or Firm* — Young & Thompson

(57) ABSTRACT

A motor vehicle electronic computer (10), includes: an electrical power supply device (11) supplying a first regulated electrical voltage V1 and a second regulated electrical voltage V2 greater than V1; control peripherals (13) of the vehicle actuators (30); and a processor (12) connected to the first electrical voltage source, controlling the control peripherals. The computer includes at least one control peripheral (14), including an output switch (141) having to be supplied with an electrical voltage of value V2, and a voltage step-up circuit (140) supplying, on an output port (140b), an electrical voltage of value V2 for the power supply of a control circuit (142) of the output switch from an electrical voltage, on an input port (140a) of the voltage step-up circuit, of a lower value than the value V2. A vehicle including such an electronic computer (10) is also described.

11 Claims, 3 Drawing Sheets

(56) References Cited

U.S. PATENT DOCUMENTS

| | | | | |
|---|---|---|---|---|
| 6,662,301 B1 * | 12/2003 | Sekine | ................. | G06F 1/266 713/320 |
| 8,078,893 B2 * | 12/2011 | Umedu | ................. | G06F 1/266 713/320 |
| 2010/0306565 A1 * | 12/2010 | Umedu | ................. | G06F 1/266 713/324 |
| 2011/0301811 A1 * | 12/2011 | Boissiere | ............. | H02J 7/0065 701/36 |

\* cited by examiner

MOTOR VEHICLE ELECTRONIC COMPUTER COMPRISING A ROBUST PERIPHERAL, ASSOCIATED MOTOR VEHICLE

BACKGROUND OF THE INVENTION

1. Field of the Invention

The present invention belongs to the field of electronic computers in motor vehicles, and relates more particularly to the management by such computers of fluctuations of an electrical voltage supplied by an electrical power source of said electronic computers.

2. Description of the Related Art

Generally speaking, motor vehicle electronic computers are connected to the same power source, namely a battery of said motor vehicle.

Under normal operating conditions, the battery of a motor vehicle delivers a nominal electrical voltage generally of the order of 12 volts (V) (or 24 V). However, it is known that the electrical voltage supplied by such a battery fluctuates around the nominal value in particular according to the charge/discharge cycles of said battery, the wear of said battery, ambient temperature, etc.

For this purpose, in each electronic computer connected to the battery of the motor vehicle, an electrical power supply device is generally provided which supplies a regulated electrical voltage to the various electronic components of the electronic calculator from the fluctuating electrical voltage supplied by said battery.

These days, many motor vehicle electronic calculators use for their operation at least two electrical voltages with different regulated values. This is, for example, the case of the electronic computer controlling the operation of the motor vehicle engine, called an 'engine control unit'.

In a known way, the engine control unit comprises a processor provided for operating with an electrical voltage regulated around a value V1, generally equal to 3.3 V, and peripherals for controlling motor vehicle engine actuators, provided for operating with an electrical voltage regulated around a value V2 greater than V1, generally equal to 5 V. Thus, the electrical power supply device of the engine control unit must supply two electrical voltages regulated around 3.3 V and 5 V respectively.

Such a need to have at least two electrical voltages regulated around different respective values is explained by a need to ensure that the control peripherals can effectively drive the various motor vehicle engine actuators, while reducing the electrical consumption of the engine control unit.

The control peripherals include output switches that drive motor vehicle engine actuators. These output switches are generally MOSFET transistors (Metal Oxide Semiconductor Field Effect Transistor, or an insulated gate field effect transistor), and require a gate-source electrical voltage of 5 V for ensuring that they are switched regardless of the driven actuator.

On the other hand, the electrical consumption of a processor decreases when the value of the electrical voltage supplying it decreases, which is why it is advantageous to have another electrical voltage regulated around a value V1 less than 5 V, e.g. equal to 3.3 V.

It is not uncommon, when the battery of the motor vehicle is worn and/or when the ambient temperature is very low (e.g. less than 10 degrees Celsius), that the value of the electrical voltage supplied by said battery becomes insufficient for the respective electrical power supply devices of the various electronic calculators to supply the electrical voltage regulated around 5 V.

This can occur particularly during the startup of the motor vehicle engine, since said startup requires a large electrical current from the battery, which may be accompanied by a temporary drop in the electrical voltage supplied by said battery to the respective electrical power supply devices of the various electronic computers.

For this purpose, the electrical power supply device of the engine control unit comprises a supervisory circuit which monitors the value of the electrical voltage supplied by the motor vehicle battery. When said value is too low to ensure that an electrical voltage regulated around 5 V is supplied, a first predefined alert signal, designated by '5V_reset', is sent to the processor of the engine control unit. When the value of the electrical voltage supplied by the battery is too low to ensure that an electrical voltage regulated around 3.3 V is supplied, a second predefined alert signal, designated by '3.3V_reset', is sent to said processor.

When the engine control unit processor receives a 5V_reset alert signal, the operation of said processor is interrupted in order to anticipate a possible loss of the electrical voltage regulated around 3.3 V. The control peripherals are also deactivated since, as the electrical voltage value of 5 V is no longer provided, it is not certain that their configuration can be maintained.

When the electrical voltage regulated around 5 V is again provided, the processor resets said control peripherals in order to ensure that they are correctly configured.

Clearly it follows then that there is a loss of functionality since the control of some actuators is no longer possible not only when the electrical voltage regulated around 5 V is not provided, but also temporarily after the 5 V regulated electrical voltage has been restored (owing to the aforementioned reset time).

However, some actuators like the starter relay must be activated for starting the motor vehicle engine. A loss of functionality is therefore problematic. This further proves all the more problematic for engines provided with an automatic 'stop and start' system.

BRIEF SUMMARY OF THE INVENTION

The aim of the present invention is to overcome all or some of the limitations of the prior art solutions, particularly those described above, by providing a solution enabling the use of certain actuators.

For this purpose, and according to a first aspect, the invention relates to a motor vehicle electronic computer, comprising:

an electrical power supply device suitable for supplying, on a first power supply port, an electrical voltage regulated around a value V1 and, on a second power supply port, an electrical voltage regulated around a value V2 greater than the value V1, control peripherals intended to be connected to actuators of the motor vehicle, and a processor connected to the first power supply port and suitable for controlling said control peripherals.

At least one of the control peripherals of said computer, called a 'robust peripheral', comprises:

an output switch having to be controlled by an electrical voltage of value V2, a voltage step-up circuit suitable for supplying, on an output port of said voltage step-up circuit, an electrical voltage of value V2 for the power supply of a control circuit of said output switch from an electrical voltage, on an input port of said voltage step-up circuit, of a lower value than said value V2.

Owing to the fact that the robust peripheral comprises a voltage step-up circuit, clearly the output switch may be controlled, via said voltage step-up circuit, including when the electrical power supply device of said electronic computer no longer provides the electrical voltage regulated around the value V2.

Moreover, the voltage step-up circuit is internal to the robust peripheral, so that it is possible to optimize the electrical consumption during the phases in which the electrical voltage regulated around the value V2 is no longer ensured. Indeed, it is then possible for such an internal voltage step-up circuit only to be provided for those control peripherals which must remain activated during the startup of the motor vehicle engine in adverse conditions.

The alternative which would be to provide a central voltage step-up circuit which would supply all the control peripherals during the startup of the motor vehicle engine would be much less efficient, since it would lead to keeping control peripherals activated which do not necessarily have to remain activated during the startup of said engine of said motor vehicle.

According to particular embodiments, the electronic computer comprises one or more of the following characteristics, taken alone or according to all the technically possible combinations.

In one particular embodiment, the robust peripheral comprises a supervisory circuit connected to the first power supply port of the electrical power supply device and suitable for operating under an electrical voltage of value V1, said supervisory circuit being configured for connecting by default the output switch control circuit to the second output port of the electrical power supply device, and for connecting said control circuit to the output port of the voltage step-up circuit when the electrical voltage regulated around the value V2 is no longer provided on said second power supply port.

Such arrangements can be used to optimize the use of the voltage step-up circuit of the robust peripheral, since it is only used when the electrical power supply device is no longer able to supply the electrical voltage regulated around the value V2, thanks to the supervisory circuit which can continue to operate while the electrical power supply device is still able to supply the electrical voltage regulated around the value V1.

In one particular embodiment, the electrical power supply device is configured for sending a predefined alert signal to the supervisory circuit of the robust peripheral when the electrical voltage regulated around the value V2 is no longer provided on the second power supply port, and said supervisory circuit is configured for connecting the output switch control circuit to the output port of the voltage step-up circuit in response to receiving said alert signal.

Because the supervisory circuit receives the alert signal directly from the electrical power supply device, i.e. without passing through the processor, the robust peripheral can be kept activated independently without the intervention of said processor, said processor consequently being able to interrupt its operation in response to receiving the same alert signal without having to activate the use of the voltage step-up circuit in the robust peripheral.

In one particular embodiment, the control circuit is split into at least two parts:
a first part connected to the output switch and having to be supplied with an electrical voltage of value V2,
a second part connected to the first power supply port of the electrical power supply device and suitable for operating under an electrical voltage of value V1.

Such arrangements can be used to optimize the use of the voltage step-up circuit. Indeed, the first part of the control circuit can be limited just to the electronic components that must be supplied under an electrical voltage of value V2 so that the output switch can be controlled. The second part of said control circuit may comprise all the electronic components that can be supplied by an electrical voltage of a value less than V2 without affecting the control of said output switch.

In one particular embodiment, the input port of the voltage step-up circuit of the robust peripheral is connected to the first power supply port of the electrical power supply device.

According to a second aspect, the invention relates to a motor vehicle comprising at least one electronic computer conforming to any one of the embodiments of the invention.

BRIEF DESCRIPTION OF THE DRAWINGS

The invention will be better understood on reading the following description, given by way of a non-restrictive example, and referring to the figures, in which.

DETAILED DESCRIPTION OF THE PREFERRED EMBODIMENTS

In these figures, identical references from one figure to another designate identical or similar elements. For reasons of clarity, the elements depicted are not to scale, unless stated otherwise.

The present invention relates to a motor vehicle electronic computer.

In the remainder of the description, the case is considered non-restrictively of an electronic computer controlling the operation of the motor vehicle engine, called an 'engine control unit' 10.

Figure 1:
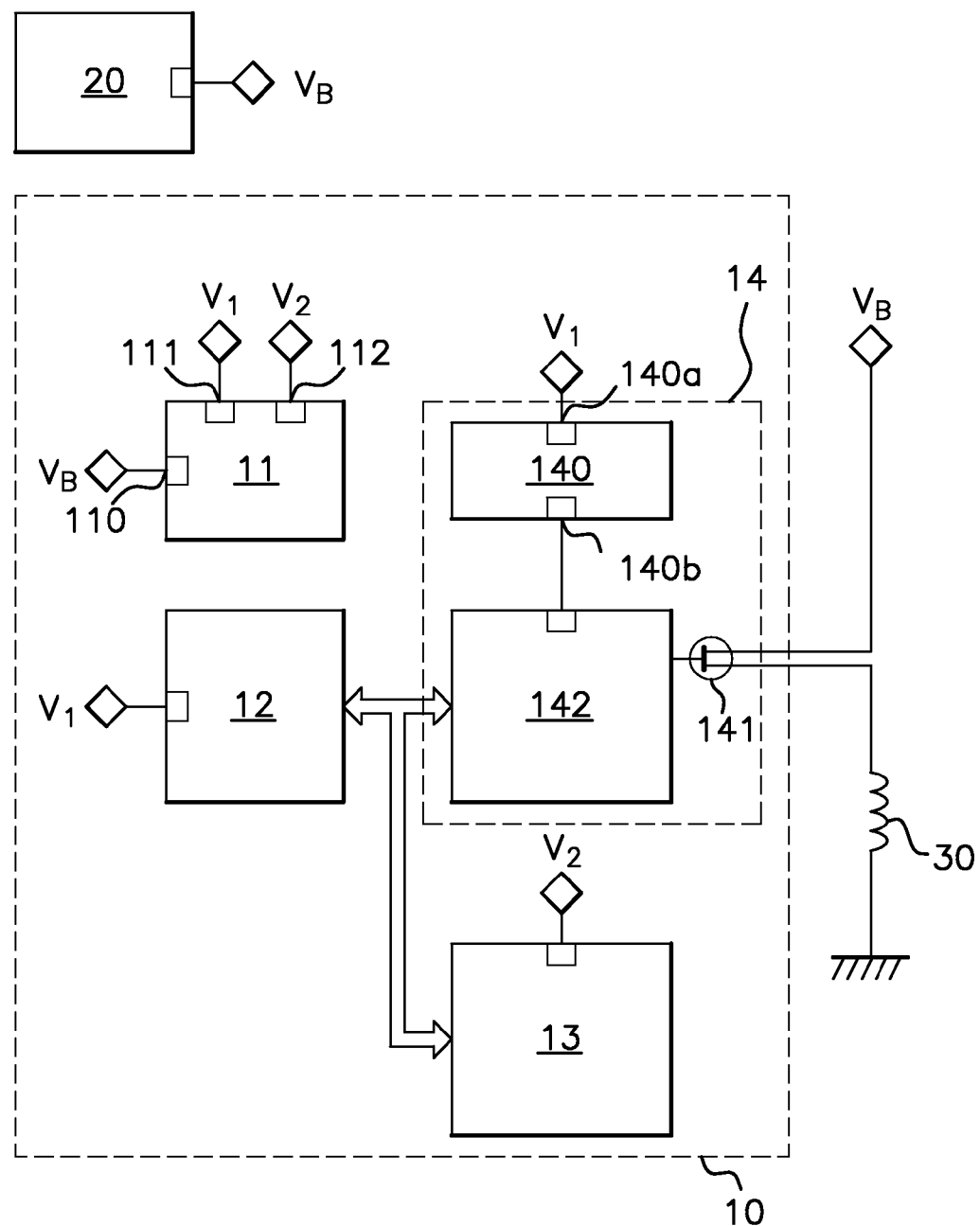
FIG. 1: is a schematic representation of a first embodiment of an electronic computer according to the invention.

FIG. 1 schematically depicts a first particular embodiment of an engine control unit 10. It comprises in particular an electrical power supply device 11.

Said electrical power supply device 11 comprises an input port 110 connected to the motor vehicle battery 20. The remainder of the description relates in a non-restrictive way to the case where the battery 20 supplies a nominal electrical voltage $V_B$ of 12 V.

The electrical power supply device 11 is implemented for supplying power, from the electrical voltage supplied by the battery 20, to all the electronic components of the engine control unit 10.

For this purpose, the electrical power supply device 11 also comprises two output ports:
a first output port, called the 'first power supply port' 111, and
a second output port, called the 'second power supply port' 112.

The electrical power supply device 11 is suitable for supplying, on the first power supply port 111 and from the electrical voltage $V_B$ supplied by the battery 20, an electrical voltage regulated around a value V1.

The electrical power supply device 11 is also suitable for supplying, on the second power supply port 112 and from the electrical voltage $V_B$ supplied by the battery 20, an electrical voltage regulated around a value V2 greater than the value V1.

The remainder of the description relates in a non-restrictive way to the case where the value V1 is equal to 3.3 V and the value V2 is equal to 5 V.

The engine control unit 10 comprises control peripherals 13, 14, intended to be connected to actuators of the motor vehicle engine, for driving the operation thereof. In the example illustrated in FIG. 1, the engine control unit 10 comprises two such control peripherals 13, 14.

The engine control unit 10 also comprises a processor 12 suitable for controlling the actuators via the control peripherals 13, 14.

The processor 12 is suitable for operating under an electrical voltage of 3.3 V, and consequently is connected to the first power supply port 111 of the electrical power supply device 11.

In the example illustrated in FIG. 1, each control peripheral 13, 14 is considered as comprising one or more output switches, intended to be connected to respective actuators, and having to be controlled by an electrical voltage of 5 V for ensuring the switching thereof.

For this purpose, a first control peripheral 13 is connected to the second power supply port 112 of the electrical power supply device 11.

A second control peripheral, called a 'robust peripheral' 14, comprises an internal voltage step-up circuit 140. The voltage step-up circuit 140 is suitable for supplying, on an output port 140*b*, an electrical voltage of 5 V from an electrical voltage, on an input port 140*a* of said voltage step-up circuit 140, of a value less than 5 V.

In the example illustrated in FIG. 1, the input port 140*a* of said voltage step-up circuit 140 is connected to the first power supply port 111 of the electrical power supply device 11.

In other words, the voltage step-up circuit 140 receives as input an electrical voltage regulated around 3.3 V.

The robust peripheral 14 comprises an output switch 141 having to be controlled by an electrical voltage of 5 V. The output switch 141 is connected to an actuator 30 of the motor vehicle engine.

The outlet port 140*b* of the voltage step-up circuit 140 is connected to a control circuit 142 of the output switch 141. The control circuit 142 drives the output switch 141 of the robust peripheral 14 according to control signals received from the processor 12.

The robust peripheral 14 of FIG. 1 is supplied directly and exclusively by the electrical voltage regulated around 3.3 V supplied by the electrical power supply device 11.

The electrical voltage of 5 V required by all the electronic components of said robust peripheral 14 is supplied by the voltage step-up circuit 140, from said electrical voltage regulated around 3.3 V.

It is thus clear that the robust peripheral 14 is suitable for operating when the electrical voltage regulated around 5 V is no longer provided by the electrical power supply device 11, and while said electrical power supply device 11 supplies an electrical voltage regulated around 3.3 V.

The robust peripheral 14 is preferably connected to one or more actuators having to be maintained during the startup phases of the motor vehicle engine, since it is mainly during these phases that the electrical voltage regulated around 5 V may no longer be provided. According to a non-restrictive example, the robust peripheral 14 is connected to the starting relay of the motor vehicle.

Figure 2:
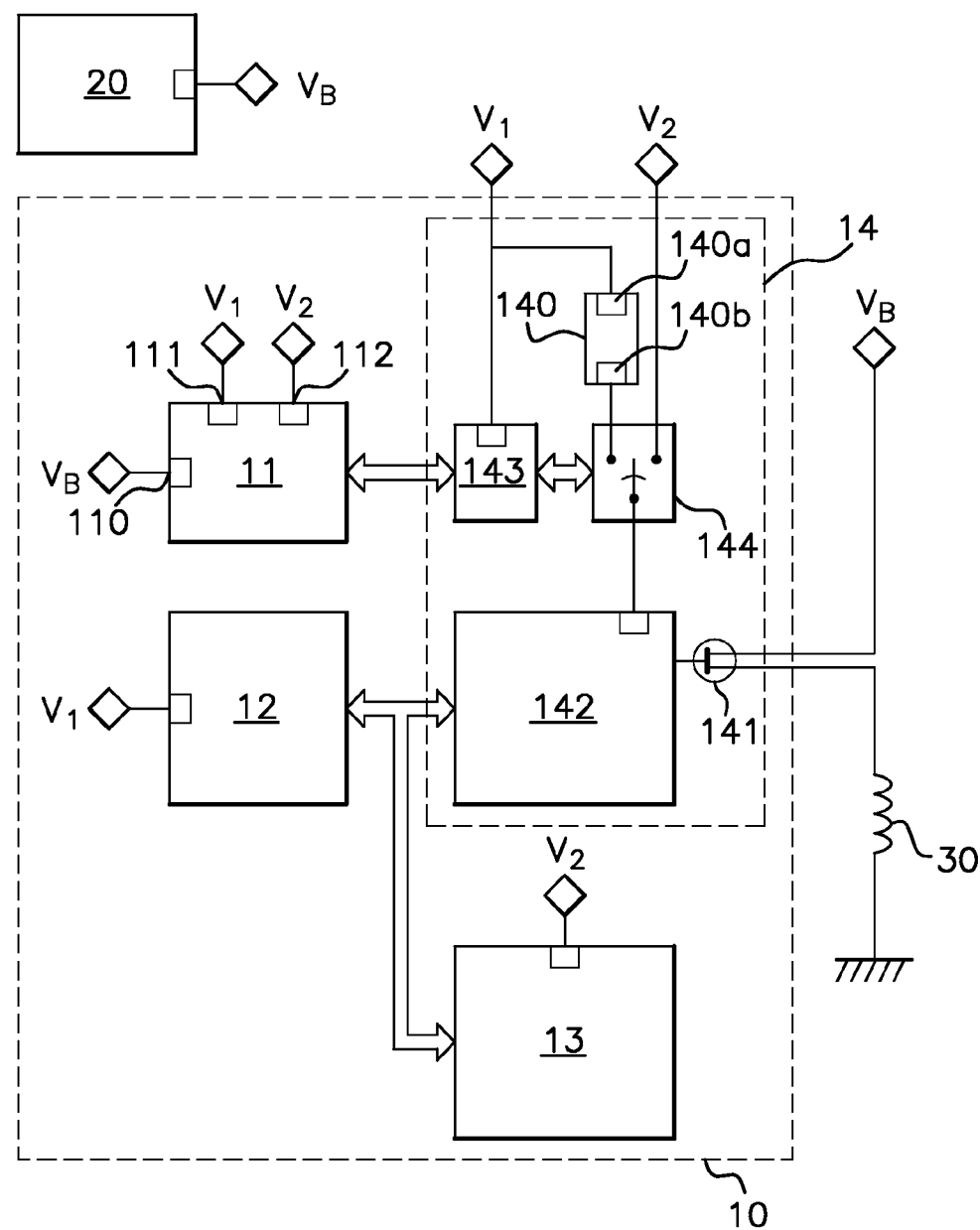
FIG. 2: is a schematic representation of a second embodiment of an electronic computer according to the invention.

FIG. 2 schematically depicts a variant embodiment of the engine control unit 10 of FIG. 1.

In the embodiment illustrated in FIG. 2, the robust peripheral 14 further comprises an internal supervisory circuit 143 suitable for operating under an electrical voltage of 3.3 V, connected for this purpose to the first power supply port 111 of the electrical power supply device 11.

In the example illustrated in FIG. 2, all the electronic components of the robust peripheral 14, with the exception of those of the supervisory circuit 143, are designed for operating under a voltage of 5 V. Thus, as was already the case in the engine control unit 10 illustrated in FIG. 1, the control circuit 142 is in particular designed for operating under an electrical voltage of 5 V.

The supervisory circuit 143 is configured for connecting by default the control circuit 142 of the output switch 141 to the second power supply port 112 of the electrical power supply device 11, and for connecting said control circuit 142 to the output port 140*b* of the voltage step-up circuit 140 when the electrical voltage regulated around 5 V is no longer provided on said second power supply port 112.

For example, the supervisory circuit 143 drives a multiplexer circuit 144 which connects said control circuit 142 either to the second power supply port 112 of the electrical power supply device 11, or to the output port 140*b* of the voltage step-up circuit 140.

The electrical power supply device 11 is, for example, configured for sending to the supervisory circuit 143 of the robust peripheral 14 an alert signal, designated by '5V_reset' when the electrical voltage regulated around 5 V is no longer provided on the second power supply port 112.

Until the supervisory circuit 143 has received the alert signal 5V_reset, the control circuit 142 is connected to the second power supply port 112 of the electrical power supply device 11, the voltage step-up circuit 140 not being used.

In response to receiving the alert signal 5V_reset, the supervisory circuit 143 disconnects said control circuit 142 from the second power supply port 112 of the electrical power supply device 11, and connects it to the output port 140*b* of the voltage step-up circuit 140, which is then used for supplying the electrical voltage of 5 V.

Clearly the use of the voltage step-up circuit 140 is optimized, and limited just to the time intervals during which the electrical power supply device 11 is no longer able to supply the electrical voltage regulated around 5 V. The supervisory circuit 143, suitable for operating under a voltage of 3.3 V, is insensitive to the interruption of the electrical voltage regulated around 5 V on the second power supply port 112.

Figure 3:
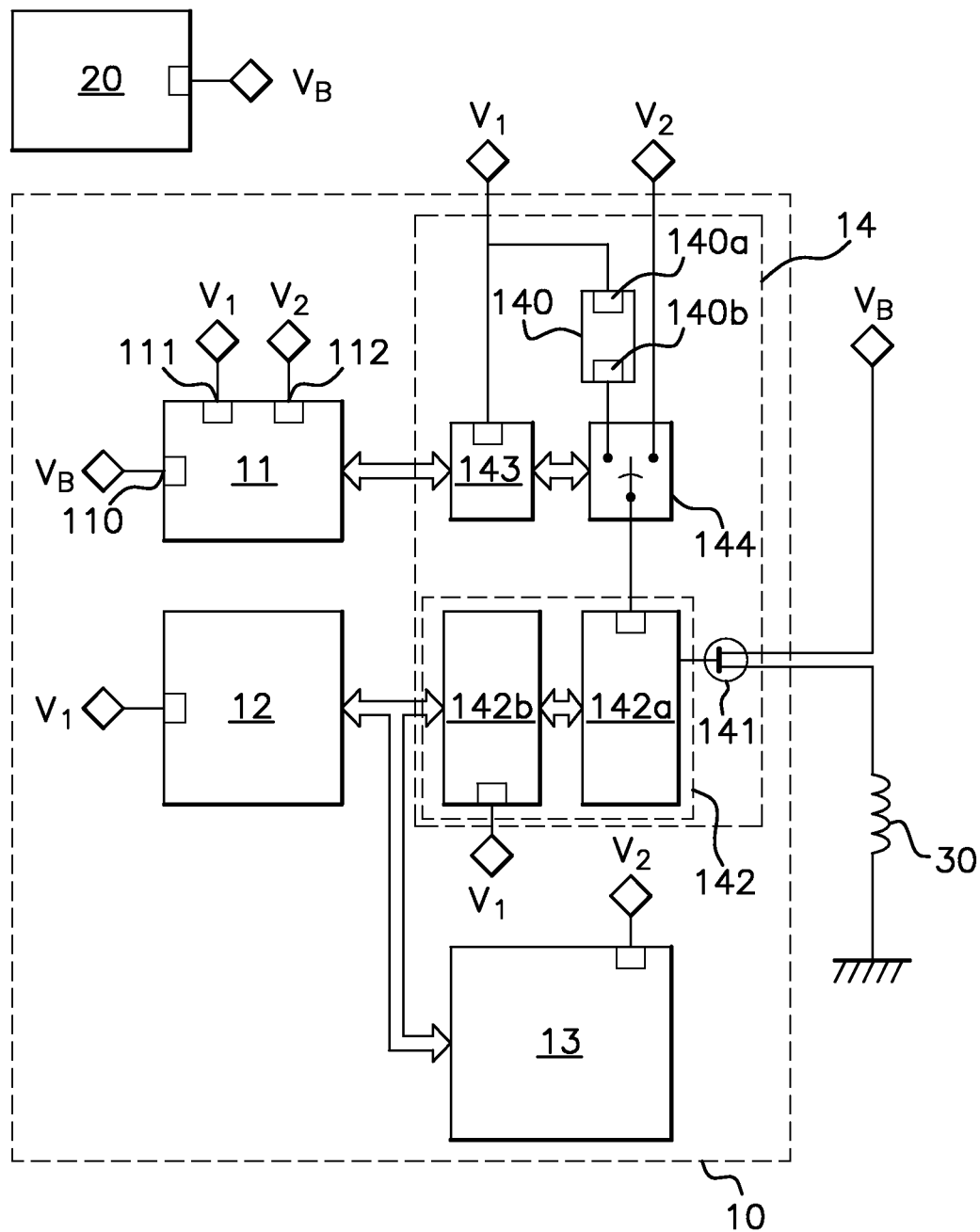
FIG. 3: is a schematic representation of a third embodiment of an electronic computer according to the invention.

FIG. 3 depicts a variant embodiment of the engine control unit 10 of FIG. 2. Compared with the engine control unit 10 illustrated in FIG. 2, electronic components are suitable for operating under an electrical voltage of 3.3 V.

More particularly, the control circuit 142 is split into two parts:
- a first part 142*a* connected to the output switch 141 and having to be supplied with an electrical voltage of 5 V,
- a second part 142*b* connected to the first power supply port 111 of the electrical power supply device 11 and suitable for operating under an electrical voltage of 3.3 V.

The second part 142*b* of the control circuit 142 drives the operation of the first part 142*a* of said control circuit 142 according to control signals received from the processor 12.

Thus the use of the voltage step-up circuit 140 is optimized, insofar as the quantity of electronic components actually supplied via the voltage step-up circuit 140 is reduced with respect to the engine control unit 10 of FIG. 2.

More generally, the scope of the present invention is not limited to the embodiments described above as non-restrictive examples, but on the contrary extends to all the modifications within the scope of a person skilled in the art.

In particular, it is clear that an electronic computer according to the invention may comprise several robust peripherals for controlling various actuators, each robust peripheral comprising its own voltage step-up circuit.

Furthermore, nothing precludes providing, in the same robust peripheral, a plurality of voltage step-up circuits, for redundancy purposes and/or for controlling various output switches.

Moreover, if a robust peripheral comprises a plurality of output switches, nothing excludes having some of these output switches not supplied via a voltage step-up circuit, in particular if these output switches do not have to be switched during the startup of the motor vehicle engine.

The foregoing description clearly illustrates that through its various characteristics and their advantages, the present invention achieves the objectives that were set.

In particular, it is clear that by fitting a motor vehicle electronic computer with at least one robust peripheral comprising an internal voltage step-up circuit, actuators may be kept activated if the electrical voltage regulated around 5 V is no longer provided, even if the processor stops operating.

The invention claimed is:

1. A motor vehicle electronic computer, comprising:
    an electrical power supply device configured to supply, at a first power supply port, an electrical voltage regulated around a value V1 and, at a second power supply port, an electrical voltage regulated around a value V2 greater than the value V1;
    control peripherals configured to be connected to actuators of a motor vehicle, at least one of the control peripherals being a robust peripheral comprising:
        an output switch having configured to be controlled by an electrical voltage of value V2, and
        a voltage step-up circuit configured to supply, at an output port of said voltage step-up circuit, an electrical voltage of value V2 for the power supply of a control circuit of said output switch from an electrical voltage, at an input port of said voltage step-up circuit, of a lower value than said value V2; and
    a processor connected to the first power supply port and configured to control the control peripherals.

2. The electronic computer as claimed in claim 1, wherein the robust peripheral comprises a supervisory circuit connected to the first power supply port of the electrical power supply device and configured to operate under an electrical voltage of value V1, said supervisory circuit being configured to connect by default the output switch control circuit to the second output port of the electrical power supply device, and to connect said control circuit to the output port of the voltage step-up circuit when the electrical voltage regulated around the value V2 is no longer provided on said second power supply port.

3. The electronic computer as claimed in claim 2, wherein the electrical power supply device is configured to send a predefined alert signal to the supervisory circuit of the robust peripheral when the electrical voltage regulated around the value V2 is no longer provided on the second power supply port, and
    the supervisory circuit is configured to connect the output switch control circuit to the output port of the voltage step-up circuit in response to receiving said alert signal.

4. The electronic computer as claimed in claim 1, wherein the control circuit is split into two parts including
    a first part connected to the output switch and configured to be supplied with an electrical voltage of value V2, and
    a second part connected to the first power supply port of the electrical power supply device and configured to operate under an electrical voltage of value V1.

5. The electronic computer as claimed in claim 1, wherein the input port of the voltage step-up circuit of the robust peripheral is connected to the first power supply port of the electrical power supply device.

6. A motor vehicle, comprising:
    at least one electronic computer as claimed in claim 1.

7. The electronic computer as claimed in claim 2, wherein the control circuit is split into two parts including
    a first part connected to the output switch and configured to be supplied with an electrical voltage of value V2, and
    a second part connected to the first power supply port of the electrical power supply device and configured to operate under an electrical voltage of value V1.

8. The electronic computer as claimed in claim 3, wherein the control circuit is split into two parts including
    a first part connected to the output switch and configured to be supplied with an electrical voltage of value V2, and
    a second part connected to the first power supply port of the electrical power supply device and configured to operate under an electrical voltage of value V1.

9. The electronic computer as claimed in claim 2, wherein the input port of the voltage step-up circuit of the robust peripheral is connected to the first power supply port of the electrical power supply device.

10. The electronic computer as claimed in claim 3, wherein the input port of the voltage step-up circuit of the robust peripheral is connected to the first power supply port of the electrical power supply device.

11. The electronic computer as claimed in claim 4, wherein the input port of the voltage step-up circuit of the robust peripheral is connected to the first power supply port of the electrical power supply device.

* * * * *